United States Patent
Mallinson et al.

(10) Patent No.: US 8,547,401 B2
(45) Date of Patent: *Oct. 1, 2013

(54) PORTABLE AUGMENTED REALITY DEVICE AND METHOD

(75) Inventors: Dominic S. Mallinson, Foster City, CA (US); Richard L. Marks, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/922,514

(22) Filed: Aug. 19, 2004

(65) Prior Publication Data

US 2006/0038833 A1 Feb. 23, 2006

(51) Int. Cl.
*G09G 5/00* (2006.01)

(52) U.S. Cl.
USPC .......................................... 345/633; 345/632

(58) Field of Classification Search
USPC .................................................. 345/632, 633
See application file for complete search history.

(56) References Cited

U.S. PATENT DOCUMENTS

| | | | |
|---|---|---|---|
| 3,943,277 A | 3/1976 | Everly et al. | 348/169 |
| 4,263,504 A | 4/1981 | Thomas | 235/454 |
| 4,313,227 A | 1/1982 | Eder | 398/106 |
| 4,558,864 A | 12/1985 | Medwedeff | 273/148 B |
| 4,565,999 A | 1/1986 | King et al. | 345/158 |
| 4,802,227 A | 1/1989 | Elko et al. | 381/92 |
| 4,823,001 A | 4/1989 | Kobayashi et al. | 356/616 |
| 4,843,568 A | 6/1989 | Krueger et al. | 382/100 |
| 5,034,986 A | 7/1991 | Karmann et al. | 382/103 |
| 5,055,840 A | 10/1991 | Bartlett | 341/31 |
| 5,111,401 A | 5/1992 | Everett et al. | 701/24 |
| 5,144,594 A | 9/1992 | Gilchrist | 367/129 |
| 5,195,179 A | 3/1993 | Tokunaga | 395/161 |
| 5,260,556 A | 11/1993 | Lake et al. | 235/494 |
| 5,297,061 A | 3/1994 | Dementhon et al. | 345/180 |
| 5,335,011 A | 8/1994 | Addeo et al. | 348/15 |
| 5,365,048 A * | 11/1994 | Komiya et al. | 235/462.08 |

(Continued)

FOREIGN PATENT DOCUMENTS

| | | |
|---|---|---|
| EP | 0353200 | 1/1990 |
| EP | 0652686 | 5/1995 |

(Continued)

OTHER PUBLICATIONS

"The Tracking Cube: A Three-Dimentional Input Device", IBM Technical Disclosure Bulletin, Aug. 1, 1989, pp. 91-95, No. 3B, IBM Corp.New York, U.S.

(Continued)

*Primary Examiner* — Jeffrey Chow
(74) *Attorney, Agent, or Firm* — Martine Penilla Group, LLP

(57) ABSTRACT

A portable device configured to provide an augmented reality experience is provided. The portable device has a display screen configured to display a real world scene. The device includes an image capture device associated with the display screen. The image capture device is configured to capture image data representing the real world scene. The device includes image recognition logic configured to analyze the image data representing the real world scene. Image generation logic responsive to the image recognition logic is included. The image generation logic is configured to incorporate an additional image into the real world scene. A computer readable medium and a system providing an augmented reality environment are also provided.

13 Claims, 9 Drawing Sheets

(56) References Cited

U.S. PATENT DOCUMENTS

| | | | |
|---|---|---|---|
| 5,394,168 A | 2/1995 | Smith, III et al. | 345/156 |
| 5,426,450 A | 6/1995 | Drumm | 345/168 |
| 5,435,554 A | 7/1995 | Lipson | 273/88 |
| 5,455,685 A | 10/1995 | Mori | 348/363 |
| 5,473,701 A | 12/1995 | Cezanne et al. | 381/92 |
| 5,485,273 A | 1/1996 | Mark et al. | 356/350 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/158 |
| 5,583,478 A | 12/1996 | Renzi | 340/407.1 |
| 5,586,231 A | 12/1996 | Florent et al. | 345/472 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,675,828 A | 10/1997 | Stoel et al. | 395/825 |
| 5,677,710 A | 10/1997 | Thompson-Rohrlich | 345/173 |
| 5,706,364 A | 1/1998 | Kopec et al. | 382/159 |
| 5,742,263 A * | 4/1998 | Wang et al. | 345/8 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,846,086 A | 12/1998 | Bizzi et al. | 434/247 |
| 5,850,222 A | 12/1998 | Cone | 345/418 |
| 5,850,473 A | 12/1998 | Andersson | 382/165 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,923,306 A | 7/1999 | Mallinson et al. | 345/2 |
| 5,923,318 A | 7/1999 | Zhai et al. | 345/157 |
| 5,929,444 A | 7/1999 | Leichner | 250/341.7 |
| 5,930,383 A | 7/1999 | Netzer | 382/154 |
| 5,930,741 A | 7/1999 | Kramer | 702/153 |
| 5,937,081 A * | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,978,772 A | 11/1999 | Mold | 705/16 |
| 5,993,314 A | 11/1999 | Dannenberg et al. | 461/1 |
| 6,009,210 A | 12/1999 | Kang | 382/276 |
| 6,021,219 A | 2/2000 | Andersson et al. | 382/190 |
| 6,031,545 A * | 2/2000 | Ellenby et al. | 345/632 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,075,895 A | 6/2000 | Qiao et al. | 382/276 |
| 6,078,789 A | 6/2000 | Bodenmann et al. | 455/66 |
| 6,091,905 A | 7/2000 | Yahav et al. | 396/106 |
| 6,094,625 A * | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A | 11/2000 | Kanade et al. | 345/113 |
| 6,160,540 A | 12/2000 | Fishkin et al. | 345/184 |
| 6,166,744 A * | 12/2000 | Jaszlics et al. | 345/629 |
| 6,173,059 B1 | 1/2001 | Huang et al. | 381/92 |
| 6,175,343 B1 * | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,282,362 B1 * | 8/2001 | Murphy et al. | 386/46 |
| 6,292,158 B1 * | 9/2001 | Amafuji et al. | 345/7 |
| 6,295,064 B1 | 9/2001 | Yamaguchi | 345/419 |
| 6,297,838 B1 | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,392,644 B1 | 5/2002 | Miyata et al. | 345/419 |
| 6,394,897 B1 | 5/2002 | Togami | 463/4 |
| 6,400,374 B2 | 6/2002 | Lanier | 345/630 |
| 6,409,602 B1 | 6/2002 | Wiltshire et al. | 463/42 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | 345/156 |
| 6,435,969 B1 * | 8/2002 | Tanaka et al. | 463/44 |
| 6,441,825 B1 | 8/2002 | Peters | 345/473 |
| 6,473,516 B1 | 10/2002 | Kawaguchi et al. | 382/100 |
| 6,498,860 B1 | 12/2002 | Sasaki et al. | 382/103 |
| 6,504,535 B1 * | 1/2003 | Edmark | 345/419 |
| 6,512,919 B2 * | 1/2003 | Ogasawara | 455/422.1 |
| 6,516,466 B1 | 2/2003 | Jackson | 725/62 |
| 6,519,359 B1 | 2/2003 | Nafis et al. | 382/154 |
| 6,533,420 B1 | 3/2003 | Eichenlaub | 353/7 |
| 6,542,927 B2 | 4/2003 | Rhoads | 709/217 |
| 6,545,706 B1 | 4/2003 | Edwards et al. | 348/169 |
| 6,546,153 B1 | 4/2003 | Hoydal | 382/285 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,587,835 B1 | 7/2003 | Treyz et al. | 705/14 |
| 6,593,956 B1 | 7/2003 | Potts et al. | 348/14.09 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,674,415 B2 | 1/2004 | Nakamura et al. | 345/32 |
| 6,676,522 B2 | 1/2004 | Rowe et al. | 463/42 |
| 6,677,967 B2 | 1/2004 | Sawano et al. | 715/839 |
| 6,677,987 B1 | 1/2004 | Girod | 348/171 |
| 6,709,108 B2 | 3/2004 | Levine et al. | 351/211 |
| 6,712,703 B2 | 3/2004 | Miyamoto et al. | 463/43 |
| 6,720,949 B1 | 4/2004 | Pryor et al. | 345/158 |
| 6,727,988 B2 | 4/2004 | Kim et al. | 356/319 |
| 6,741,741 B2 | 5/2004 | Farrell | 382/199 |
| 6,746,124 B2 | 6/2004 | Fischer et al. | 353/43 |
| 6,751,338 B1 | 6/2004 | Wallack | 382/106 |
| 6,753,849 B1 | 6/2004 | Curran et al. | 345/158 |
| 6,767,282 B2 | 7/2004 | Matsuyama et al. | 463/3 |
| 6,769,769 B2 | 8/2004 | Podlleanu et al. | 351/221 |
| 6,772,057 B2 | 8/2004 | Breed et al. | 701/45 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,791,531 B1 | 9/2004 | Johnston et al. | 345/157 |
| 6,795,068 B1 | 9/2004 | Marks | 345/419 |
| 6,809,776 B1 | 10/2004 | Simpson | 348/565 |
| 6,819,318 B1 | 11/2004 | Geng | 345/420 |
| 6,847,311 B2 | 1/2005 | Li | 341/28 |
| 6,863,609 B2 | 3/2005 | Okuda et al. | 463/36 |
| 6,870,526 B2 | 3/2005 | Zngf et al. | 345/185 |
| 6,873,747 B2 | 3/2005 | Askary | 382/295 |
| 6,881,147 B2 | 4/2005 | Naghi et al. | 463/35 |
| 6,884,171 B2 | 4/2005 | Eck et al. | 463/42 |
| 6,890,262 B2 | 5/2005 | Oishi et al. | 463/31 |
| 6,917,688 B2 | 7/2005 | Yu et al. | 381/94.7 |

| | | | | | | |
|---|---|---|---|---|---|---|
| 6,919,824 B2 | 7/2005 | Lee .................................. 341/20 | 2002/0072414 A1 | 6/2002 | Stylinski et al. ................ 463/42 |
| 6,924,787 B2 | 8/2005 | Kramer et al. .................. 345/156 | 2002/0075286 A1* | 6/2002 | Yonezawa et al. .............. 345/679 |
| 6,928,180 B2 | 8/2005 | Stam et al. ...................... 382/104 | 2002/0083461 A1 | 6/2002 | Hutcheson et al. .............. 725/62 |
| 6,930,725 B1* | 8/2005 | Hayashi .......................... 348/373 | 2002/0085097 A1 | 7/2002 | Colmenarez et al. ......... 348/211 |
| 6,931,596 B2 | 8/2005 | Gutta et al. ..................... 715/728 | 2002/0094189 A1* | 7/2002 | Navab et al. ....................... 386/4 |
| 6,943,776 B2 | 9/2005 | Ehrenburg ...................... 345/168 | 2002/0126898 A1* | 9/2002 | Guo ................................ 382/199 |
| 6,945,653 B2 | 9/2005 | Kobori et al. .................... 353/30 | 2002/0126899 A1 | 9/2002 | Farrell ............................. 382/199 |
| 6,951,515 B2 | 10/2005 | Ohshima et al. ................. 463/31 | 2002/0134151 A1 | 9/2002 | Naruoka et al. .................. 73/291 |
| 6,952,198 B2 | 10/2005 | Hansen ........................... 345/158 | 2002/0158873 A1 | 10/2002 | Williamson .................... 345/427 |
| 6,965,362 B1 | 11/2005 | Ishizuka ............................ 345/82 | 2003/0014212 A1* | 1/2003 | Ralston et al. .................. 702/150 |
| 6,970,183 B1 | 11/2005 | Monroe .......................... 348/143 | 2003/0022716 A1 | 1/2003 | Park et al. ......................... 463/36 |
| 6,990,639 B2 | 1/2006 | Wilson ............................ 715/863 | 2003/0063575 A1* | 4/2003 | Kinjo .............................. 370/265 |
| 7,006,009 B2* | 2/2006 | Newman ..................... 340/854.5 | 2003/0093591 A1 | 5/2003 | Hohl ................................. 710/22 |
| 7,016,411 B2 | 3/2006 | Azuma et al. ............. 375/240.08 | 2003/0100363 A1 | 5/2003 | Ali ................................... 436/30 |
| 7,016,532 B2 | 3/2006 | Boncyk et al. .................. 382/165 | 2003/0111531 A1* | 6/2003 | Williams ........................ 235/383 |
| 7,039,199 B2 | 5/2006 | Rui ................................... 381/92 | 2003/0160862 A1 | 8/2003 | Charlier et al. ............. 348/14.08 |
| 7,039,253 B2 | 5/2006 | Matsuoka et al. ............... 382/295 | 2003/0189646 A1* | 10/2003 | Bean et al. .................. 348/207.99 |
| 7,042,440 B2 | 5/2006 | Pryor et al. ..................... 345/158 | 2003/0220145 A1* | 11/2003 | Erickson et al. ................. 463/47 |
| 7,043,056 B2 | 5/2006 | Edwards et al. ................ 382/103 | 2003/0232649 A1* | 12/2003 | Gizis et al. ........................ 463/40 |
| 7,054,452 B2 | 5/2006 | Ukita ................................ 381/92 | 2004/0001082 A1 | 1/2004 | Said ................................ 345/730 |
| 7,059,962 B2 | 6/2006 | Watashiba ............................ 463/2 | 2004/0017355 A1 | 1/2004 | Shim ............................... 345/157 |
| 7,061,507 B1 | 6/2006 | Tuomi et al. ................... 345/611 | 2004/0035925 A1 | 2/2004 | Wu et al. ........................ 235/380 |
| 7,071,914 B1 | 7/2006 | Marks ............................. 345/156 | 2004/0054512 A1* | 3/2004 | Kim et al. ........................... 703/8 |
| 7,084,887 B1* | 8/2006 | Sato et al. ....................... 345/633 | 2004/0063480 A1 | 4/2004 | Wang ................................. 463/8 |
| 7,090,352 B2 | 8/2006 | Kobori et al. .................... 353/30 | 2004/0063481 A1 | 4/2004 | Wang ................................. 463/8 |
| 7,098,891 B1 | 8/2006 | Pryor .............................. 345/158 | 2004/0070565 A1 | 4/2004 | Nayar et al. .................... 345/156 |
| 7,102,615 B2 | 9/2006 | Marks ............................. 345/156 | 2004/0087366 A1 | 5/2004 | Shum et al. ....................... 463/36 |
| 7,106,366 B2 | 9/2006 | Parker et al. .................. 348/222.1 | 2004/0095327 A1 | 5/2004 | Lo ................................... 345/169 |
| 7,113,635 B2 | 9/2006 | Robert et al. ................... 382/154 | 2004/0140955 A1 | 7/2004 | Metz ............................... 345/166 |
| 7,116,330 B2 | 10/2006 | Marshall et al. ................ 345/474 | 2004/0150728 A1* | 8/2004 | Ogino ............................. 348/239 |
| 7,116,342 B2* | 10/2006 | Dengler et al. ................. 345/630 | 2004/0178576 A1 | 9/2004 | Hillis et al. ..................... 273/148 |
| 7,121,946 B2 | 10/2006 | Paul et al. ......................... 463/36 | 2004/0189720 A1 | 9/2004 | Wilson et al. .................. 345/863 |
| 7,139,767 B1 | 11/2006 | Taylor et al. ................... 707/102 | 2004/0213419 A1 | 10/2004 | Varma et al. ..................... 381/92 |
| 7,148,922 B2 | 12/2006 | Shimada ......................... 348/370 | 2004/0227725 A1 | 11/2004 | Calarco et al. ................. 345/156 |
| 7,156,311 B2 | 1/2007 | Attia et al. ................. 235/462.46 | 2004/0254017 A1 | 12/2004 | Cheng et al. ...................... 463/35 |
| 7,164,413 B2 | 1/2007 | Davis et al. ..................... 345/163 | 2005/0001852 A1* | 1/2005 | Dengler et al. ................. 345/633 |
| 7,174,312 B2 | 2/2007 | Harper et al. ..................... 705/35 | 2005/0011957 A1* | 1/2005 | Attia et al. ................. 235/462.46 |
| 7,183,929 B1 | 2/2007 | Antebi et al. ................. 340/573.1 | 2005/0037844 A1 | 2/2005 | Shum et al. ....................... 463/36 |
| 7,212,308 B2 | 5/2007 | Morgan ........................ 358/1.18 | 2005/0047611 A1 | 3/2005 | Mao ............................. 381/94.7 |
| 7,223,173 B2 | 5/2007 | Masuyama et al. .............. 463/36 | 2005/0088369 A1 | 4/2005 | Yoshioka ......................... 345/60 |
| 7,224,384 B1 | 5/2007 | Iddan et al. ................. 348/207.99 | 2005/0102374 A1* | 5/2005 | Moragne et al. ............... 709/217 |
| 7,227,526 B2 | 6/2007 | Hildreth et al. ................. 345/156 | 2005/0105777 A1 | 5/2005 | Kozlowski et al. ............. 382/115 |
| 7,227,976 B1 | 6/2007 | Jung et al. ....................... 382/103 | 2005/0117045 A1 | 6/2005 | Abdellatif et al. .............. 384/335 |
| 7,245,273 B2 | 7/2007 | Eberl et al. ..................... 351/211 | 2005/0162385 A1 | 7/2005 | Doi et al. ........................ 345/156 |
| 7,259,375 B2 | 8/2007 | Tichit et al. .................. 250/341.8 | 2005/0198095 A1* | 9/2005 | Du et al. ......................... 709/200 |
| 7,263,462 B2 | 8/2007 | Funge et al. .................... 702/179 | 2005/0226431 A1 | 10/2005 | Mao ................................. 381/61 |
| 7,274,305 B1 | 9/2007 | Luttrell ....................... 340/870.02 | 2005/0239548 A1 | 10/2005 | Ueshima et al. ................. 463/36 |
| 7,283,679 B2 | 10/2007 | Okada et al. ................... 382/260 | 2006/0001836 A1 | 1/2006 | Kobori et al. |
| 7,296,007 B1 | 11/2007 | Funge et al. ...................... 706/47 | 2006/0033713 A1 | 2/2006 | Pryor .............................. 345/158 |
| 7,301,530 B2 | 11/2007 | Lee et al. ........................ 345/158 | 2006/0035710 A1 | 2/2006 | Festejo et al. ..................... 463/36 |
| 7,301,547 B2 | 11/2007 | Martins et al. ................. 345/633 | 2006/0038819 A1 | 2/2006 | Festejo et al. .................. 345/530 |
| 7,305,114 B2 | 12/2007 | Wolff et al. .................... 709/200 | 2006/0204012 A1 | 9/2006 | Marks et al. ..................... 381/26 |
| 7,346,387 B1 | 3/2008 | Wachter et al. ................ 600/476 | 2006/0233389 A1 | 10/2006 | Mao et al. ...................... 381/92.2 |
| 7,352,359 B2 | 4/2008 | Zalewski et al. ............... 345/156 | 2006/0252541 A1 | 11/2006 | Zalewski et al. ............... 463/156 |
| 7,364,297 B2 | 4/2008 | Goldfain et al. ................ 351/206 | 2006/0252543 A1 | 11/2006 | Van Noland et al. ............ 463/37 |
| 7,379,559 B2 | 5/2008 | Wallace et al. ................. 382/100 | 2006/0256081 A1 | 11/2006 | Zalewski et al. ............... 345/156 |
| 7,391,409 B2 | 6/2008 | Zalewski et al. ............... 345/156 | 2006/0264258 A1 | 11/2006 | Zalewski et al. ................. 463/36 |
| 7,436,887 B2 | 10/2008 | Yeredor et al. ................. 375/240 | 2006/0264259 A1 | 11/2006 | Zalewski et al. ................. 463/36 |
| 7,446,650 B2 | 11/2008 | Scholfield et al. ........... 340/425.5 | 2006/0264260 A1 | 11/2006 | Zalewski et al. ................. 463/36 |
| 7,545,926 B2 | 6/2009 | Mao ......................... 379/406.08 | 2006/0269072 A1 | 11/2006 | Mao ................................. 381/56 |
| 7,555,157 B2 | 6/2009 | Davidson et al. .............. 382/154 | 2006/0269073 A1 | 11/2006 | Mao ................................. 381/56 |
| 7,558,698 B2 | 7/2009 | Funge et al. .................... 702/179 | 2006/0274032 A1 | 12/2006 | Mao et al. ...................... 345/156 |
| 7,613,610 B1 | 11/2009 | Zimmerman et al. .......... 704/235 | 2006/0274911 A1 | 12/2006 | Mao et al. ...................... 381/334 |
| 7,623,115 B2 | 11/2009 | Marks ............................. 345/156 | 2006/0280312 A1 | 12/2006 | Mao ................................. 381/56 |
| 7,627,139 B2 | 12/2009 | Marks et al. ................... 382/103 | 2006/0282873 A1 | 12/2006 | Zalewski et al. ............... 725/133 |
| 7,636,645 B1 | 12/2009 | Yen et al. ....................... 702/152 | 2006/0287084 A1 | 12/2006 | Mao et al. ........................ 463/37 |
| 7,636,697 B1 | 12/2009 | Dobson et al. ................... 706/12 | 2006/0287085 A1 | 12/2006 | Mao et al. ........................ 463/37 |
| 7,636,701 B2 | 12/2009 | Funge et al. ...................... 706/47 | 2006/0287086 A1 | 12/2006 | Zalewski et al. ............... 436/37 |
| 7,646,372 B2 | 1/2010 | Marks et al. ................... 345/156 | 2006/0287087 A1 | 12/2006 | Zalewski et al. ................. 463/37 |
| 7,665,041 B2 | 2/2010 | Wilson et al. .................. 715/860 | 2007/0015559 A1 | 1/2007 | Zalewski et al. ................... 463/1 |
| 7,671,916 B2* | 3/2010 | Hashimoto ................. 348/333.01 | 2007/0021208 A1 | 1/2007 | Mao et al. ........................ 463/36 |
| 7,697,700 B2 | 4/2010 | Mao ............................. 381/94.3 | 2007/0025562 A1 | 2/2007 | Zalewski et al. ................. 381/92 |
| 7,721,231 B2 | 5/2010 | Wilson ............................ 715/863 | 2007/0060336 A1 | 3/2007 | Marks et al. ..................... 463/30 |
| 2001/0056477 A1 | 12/2001 | McTernan et al. ............. 709/219 | 2007/0061413 A1 | 3/2007 | Larsen et al. ................... 709/217 |
| 2002/0010655 A1* | 1/2002 | Kjallstrom ....................... 705/27 | 2007/0066394 A1 | 3/2007 | Ikeda et al. ....................... 463/37 |
| 2002/0010734 A1* | 1/2002 | Ebersole et al. ............... 709/201 | 2007/0072675 A1 | 3/2007 | Hammano et al. .............. 463/42 |
| 2002/0023027 A1 | 2/2002 | Simonds ......................... 705/26 | 2007/0120834 A1 | 5/2007 | Boillot ............................ 354/103 |
| 2002/0036617 A1 | 3/2002 | Pryor .............................. 345/156 | 2007/0120996 A1 | 5/2007 | Boillot ............................ 384/345 |
| 2002/0056114 A1 | 5/2002 | Fillebrown et al. .............. 725/78 | 2007/0260340 A1 | 11/2007 | Mao ................................. 700/94 |

| | | | |
|---|---|---|---|
| 2007/0260517 A1 | 11/2007 | Zalewski et al. | 705/14 |
| 2007/0261077 A1 | 11/2007 | Zalewski et al. | 725/35 |
| 2008/0056561 A1 | 3/2008 | Sawachi | 382/154 |
| 2008/0070684 A1 | 3/2008 | Haigh-Hutchinson | 463/32 |
| 2008/0091421 A1 | 4/2008 | Gustavsson | 704/233 |
| 2008/0208613 A1 | 8/2008 | Scibora | 705/1 |
| 2009/0010494 A1 | 1/2009 | Bechtel et al. | 382/104 |
| 2009/0016642 A1 | 1/2009 | Hart | 382/278 |
| 2009/0221368 A1 | 9/2009 | Yen et al. | 463/32 |
| 2009/0221374 A1 | 9/2009 | Yen et al. | 463/42 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |

FOREIGN PATENT DOCUMENTS

| | | |
|---|---|---|
| EP | 0750202 | 12/1996 |
| EP | 0835676 | 4/1998 |
| EP | 1098686 | 5/2003 |
| EP | 1435258 | 7/2004 |
| FR | 2814965 | 4/2002 |
| GB | 2206716 | 1/1989 |
| GB | 2206716 | 11/1989 |
| GB | 2376397 | 11/2002 |
| GB | 2388418 | 11/2003 |
| JP | 01-284897 | 11/1989 |
| JP | 06-102980 | 4/1994 |
| JP | 07-311568 | 11/1995 |
| JP | 9-128141 | 5/1997 |
| JP | 9-185456 | 7/1997 |
| JP | 11-38949 | 2/1999 |
| JP | 2000-172431 | 6/2000 |
| JP | 2000259856 | 9/2000 |
| JP | 2000-350859 | 12/2000 |
| JP | 2000-356972 | 12/2000 |
| JP | 2004-254145 | 12/2000 |
| JP | 2000350859 | 12/2000 |
| JP | 2001-166676 | 6/2001 |
| JP | 2002369969 | 12/2002 |
| JP | 2004-145448 | 5/2004 |
| JP | 2004145448 | 5/2004 |
| JP | 2005-046422 | 2/2005 |
| WO | WO 88/05942 | 8/1988 |
| WO | WO 98/48571 | 10/1998 |
| WO | WO 99/35633 | 7/1999 |
| WO | WO 99/26198 | 10/1999 |
| WO | WO 02/27456 | 2/2002 |
| WO | WO 03/079179 | 9/2003 |
| WO | WO 2005/073838 | 8/2005 |
| WO | WO 2005107911 | 11/2005 |
| WO | WO 2007095082 | 8/2007 |
| WO | WO 2008/056180 | 5/2008 |

OTHER PUBLICATIONS

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics,", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-11, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Lanier, Jaron, "Virtually there: three-dimensional tele-immersion may eventually bring the world to your desk", Scientific American, ISSN: 0036-8733, Year: 2001.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS &T, pp. 564-574 (031).

Ephraim et al. "Speech Enhancement Using a Minimum Mean -Square Error Log-Spectral Amplitude Estimator", 1985, IEEE.

Ephraim et al. "Speech Enhancement Using a Minimum Mean -Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

* cited by examiner

PORTABLE AUGMENTED REALITY DEVICE AND METHOD

BACKGROUND OF THE INVENTION

1. Field of the Invention

This invention relates generally to augmented reality applications and more particularly to combining image recognition features with augmented reality applications in order to enrich the augmented reality applications.

2. Description of the Related Art

Augmented reality (AR) attempts to enrich a user's real environment by adding spatially aligned virtual objects (3D models, 2D textures, textual annotations, etc.) to the user's environment. The goal is to create the impression that the virtual object is a part of the real environment. The users of the AR system experience the augmented environment through special display devices that are typically worn on the body, e.g., head mounts.

Current augmented reality systems suffer from issues with general registration problems, i.e., getting the computer graphics to stick to a real-world scene. For example, due to the use of multiple sensors, artifacts, such as miss-movement of the computer graphics with the real-world scene may occur. These artifacts are due to the multiple sensors having different speeds. Additionally, delays between the head tracking system and the camera used to capture the real-world scene along with the need to merge the computer graphics into the real-world scene, cause misalignment/registration problems. These registration problems may even become serious enough to cause a user to become uncomfortable when viewing the image. Additionally, the augmented reality systems tend to be complex systems that are not portable. Accordingly, there are no viable consumer applications for these augmented reality systems.

As a result, there is a need to solve the problems of the prior art to provide a method and apparatus for providing a portable device capable of providing an augmented reality experience.

SUMMARY OF THE INVENTION

Broadly speaking, the present invention fills these needs by providing a method and device enabling a portable device with a display and camera to function as an augmented reality entertainment tool. It should be appreciated that the present invention can be implemented in numerous ways, including as a method, a system, computer readable media or a device. Several inventive embodiments of the present invention are described below.

In one embodiment, a portable device configured to provide an augmented reality experience is included. The portable device has a display screen configured to display a real world scene. The device includes an image capture device associated with the display screen. The image capture device is configured to capture image data representing the real world scene. The device includes image recognition logic configured to analyze the image data representing the real world scene. Image generation logic responsive to the image recognition logic is included. The image generation logic is configured to incorporate an additional image into the real world scene.

In another embodiment, a method for augmenting display data presented to a viewer is provided. The method initiates with capturing the display data with an image capture device. The captured display data is then analyzed. Next, a marker within the captured display data is identified. Then additional display data is defined in response to identifying the marker. The captured display data and the additional display data is then presented on a display screen of the image capture device.

In yet another embodiment, a computer readable medium having program instructions for augmenting display data presented to a viewer is provided. The computer readable medium includes program instructions for capturing the display data with an image capture device. Program instructions for analyzing the captured display data and program instructions for identifying a marker within the captured display data are provided. Program instructions for defining additional display data in response to identifying the marker and program instructions for presenting the captured display data and the additional display data on a display screen of the image capture device are included.

In still yet another embodiment, a method for providing information in a portable environment is provided. The method initiates with capturing an image of a first object in a first location. Then, object characteristics of the first object are accessed based upon the image of the first object. Next, an image of a second object is captured in a second location. Then, object characteristics of the second object are accessed based upon the image of the second object. The object characteristics of the first object and the object characteristics of the second object are then presented.

In another embodiment, a computer readable medium having program instructions for providing information to a portable device is provided. The computer readable medium includes program instructions for capturing an image of a first object in a first location and program instructions for accessing object characteristics of the first object based upon the image of the first object. Program instructions for capturing an image of a second object in the second location and program instructions for accessing object characteristics of the second object based upon the image of the second object are provided. Program instructions for presenting the object characteristics of the first object and the object characteristics of the second object are included.

In yet another embodiment, a system for providing an augmented reality environment is provided. The system includes a wireless network. A portable device having a display screen and image capture capability is included. The portable device includes image recognition logic configured to analyze image data captured through an image capture device. The image recognition logic is further configured to compare the image data to image data accessible through the wireless network in order to determine a match. Image/audio generation logic responsive to the image recognition logic is included. The image/audio generation logic is configured to overlay additional image data and include an audio clip into the data captured through the image capture device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
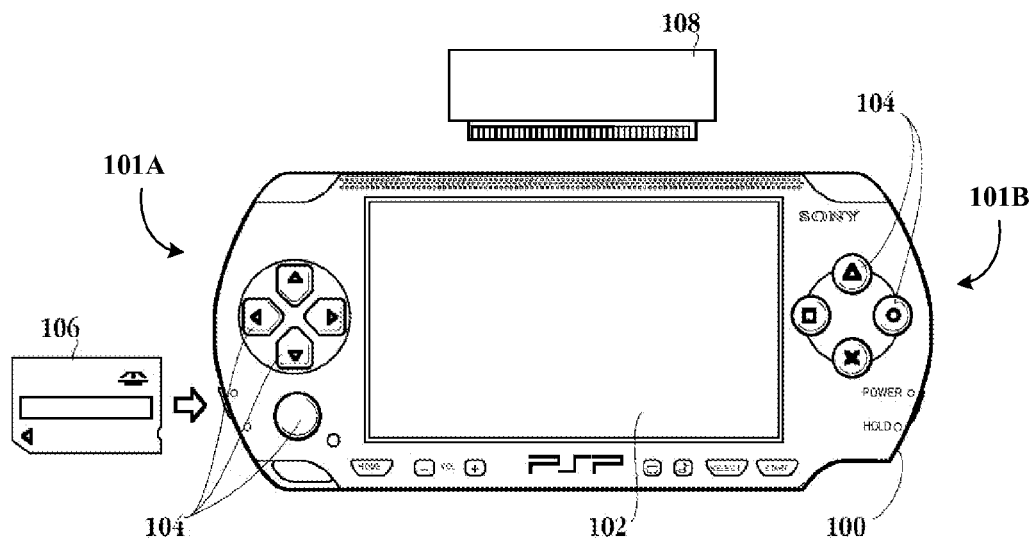
FIG. 1 is a simplified schematic diagram of a device having image capture capability, which may be used in an augmented reality application in accordance with one embodiment of the invention.

An invention is described for a system, device and method that provide an enhanced augmented reality environment. It will be obvious, however, to one skilled in the art, that the present invention may be practiced without some or all of these specific details. In other instances, well known process operations have not been described in detail in order not to unnecessarily obscure the present invention.

The embodiments of the present invention provide a system and method for enabling a low cost consumer application related to augmented reality for entertainment and informational purposes. In one embodiment, a portable device with a display, a camera and software configured to execute the functionality described below is provided. One exemplary illustration of the portable device is the PLAYSTATION PORTABLE (PSP) entertainment product combined with a universal serial bus (USB) 2.0 camera attachment and application software delivered on a universal media disk (UMD) or some other suitable optical disc media. However, the invention could also apply to cell phones with cameras or PDAs with cameras. In another embodiment, the portable device can be further augmented through use of wireless networking which is a standard option on the PSP. One skilled in the art will appreciate that Augmented Reality (AR) is a general term for when computer graphics are mixed with real video in such a way as the computer graphics adds extra information to the real scene.

In one aspect of the invention a user points the portable device having a display and a camera at a real world scene. The camera shows the scene on the portable device such that it seems that the user is seeing the world through the device. Software stored on the device or accessed through wireless network displays the real world image, and uses image processing techniques to recognize certain objects in the camera's field of vision. Based on this recognition, the portable device constructs appropriate computer graphics and overlays these graphics on the display device on top of the real world image.

As the device is a portable hand held device with limited computing resources, certain objects may be used so that the image recognition software can recognize the object with relative ease, i.e., in manner suitable for the limited processing capabilities of the portable device. Some exemplary objects are listed below. It should be appreciated that this list is not exhaustive and other objects that are recognizable may be used with the embodiments described herein.

Collectable or regular playing cards are one suitable object. In one embodiment, the playing cards have a fixed colored design in high contrast. The design graphics are easy for the device to recognize through the image recognition software. In addition, the graphics may be chosen so that the device can easily determine the orientation of the card. The portable device can then take the real image, remove the special recognized graphic and replace it with a computer-generated image and then show the resulting combination of real and computer graphics to the user on the display. As the card or the camera moves, the computer graphics move in the same way. In one embodiment, an animating character could be superimposed on the card. Alternatively, a book could be used. Similar to the cards, a clear design is used and then the portable device overlays registered computer graphics before displaying the scene to the user.

In another embodiment, the clear graphic images can be displayed on a television (TV) either from a computer game, the Internet or broadcast TV. Depending upon the software application on the device, the user would see different superimposed computer graphics on the portable display as described further below.

In yet another embodiment, a user with the device can get additional product information by analyzing the standard bar code with the camera attachment. The additional product information may include price, size, color, quantity in stock, or any other suitable physical or merchandise attribute. Alternatively, by using a special graphic design recognized by the portable device, graphics can be superimposed on the retail packaging as seen by the portable device. In addition, through a wireless network of the store in which the merchandise is located, catalogue information may be obtained about the merchandise. In one embodiment, the image data captured by the portable device is used to search for a match of the product through a library of data accessed through the wireless network. It should be appreciated that the embodiments described herein enable a user to obtain the information from a bar code without the use of special purpose laser scanning equipment. The user would also own the device and could take it from store to store. This would enable the user to do comparison-shopping more easily. Also, the device would be capable of much richer graphics than bar code scanners available in-store. In one embodiment, retailers or manufacturers could provide optical disc media with catalogues of product information. The user would put the disc in the device and then point the camera at a bar code and they would see detailed product information.

With respect to music and video, the bar code would enable the portable device to access a sample of the music and play so the user can effectively listen to a part of the CD simply by capturing an image of the bar code. Similarly, for DVD and VHS videos, a trailer can be stored in the product catalogue on the removable media of the device. This trailer can be played back to the user after they capture the bar code and the portable device processes the captured image and matches it to the corresponding trailer associated with the bar code.

Likewise, a demo of a video game could be played for video game products. It should be appreciated that there are other possible uses including product reviews, cross promotions, etc. Furthermore, it should be appreciated that the portable device is not scanning the bar code as conventional scanners. The portable device performs image processing on a captured image of the bar code and matches it with a corresponding image to access the relevant data. Furthermore, with an in-store wireless networked and a portable device like the PSP (which is wireless network enabled), there is no need for a special removable disc media catalogue. Here, the catalogue can be provided directly by the in-store wireless network.

In another embodiment, the portable device may be used as a secondary personal display in conjunction with a main display that is shared by several users. For example, several people may play a video game on a single TV and use the portable devices for additional information that is unique for each player. Likewise, for broadcast TV (e.g. game show) where several people in the home watch a single broadcast, but see different personal information on their portable device depending upon their preferences. The portable device may be used to obtain additional information from the main display. For example, with respect to a sports game, additional player information or statistics may be displayed for a selected player. It may be necessary to synchronize the graphics on the main display with those on the portable display. One approach is to use a wireless network or broadcast and to send information to each display using this network. An alternative method is to use visual cues from the main display to drive the synchronization with the portable display. As such no additional expensive network connections are required.

Figure 3:
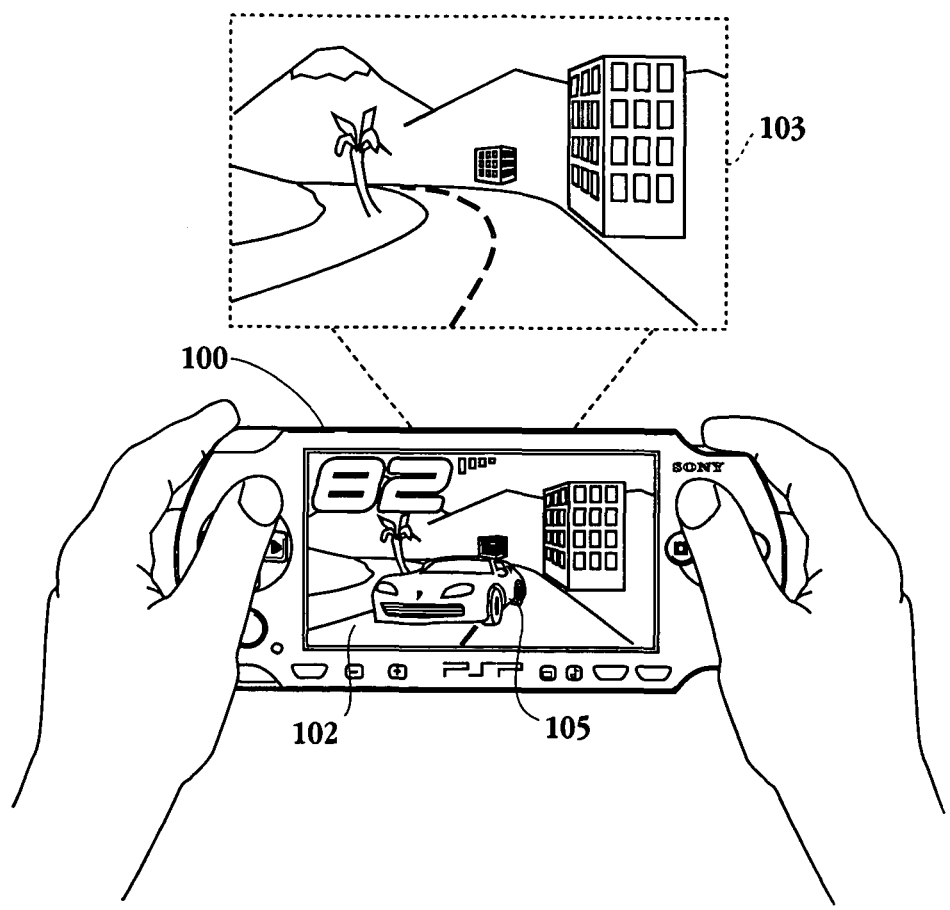
FIG. 3 is a simplified schematic diagram of an image capture device being utilized in an augmented reality application in accordance with one embodiment of the invention.

FIG. 1 is a simplified schematic diagram of a device having image capture capability, which may be used in an augmented reality application in accordance with one embodiment of the invention. Portable device 100 includes navigation buttons 104 and display screen 102. The navigation buttons 104 are defined in a left input region 101A and a right input region 101B of the portable device 100. The input regions 101A and 101B are positioned on opposite adjacent sides of the display screen, and are designed to be held by the user's hands, as is illustrated at FIG. 3. Device 100 is capable of accepting memory card 106 and image capture device 108. Image capture device 108 may include a charge couple device (CCD) in order to capture an image of a real-world scene. Alternatively, the camera functionality may be provided by a complimentary metal oxide semiconductor chip that uses an active pixel architecture to perform camera functions on-chip. In one embodiment, device 100 is a PSP device having image capture capability.

Figure 2A:
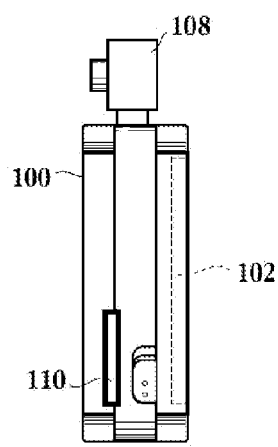
FIGS. 2A and 2B are side views of the portable device illustrated in FIG. 1.
Figure 2B:
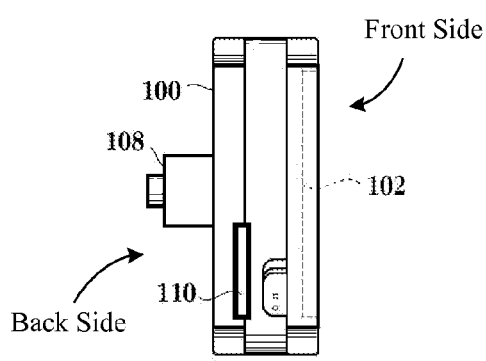

FIGS. 2A and 2B are side views of the portable device illustrated in FIG. 1. FIG. 2A shows device 100 with memory card slot 110 and display panel 102. Image capture device 108 is located on a top surface of device 100. It should be appreciated that image capture device 108 may be a pluggable device or may be hard-wired into device 100. FIG. 2B illustrates an alternative embodiment of device 100 of FIG. 1. Here, image capture device 108 is located on a backside of device 100, and the display screen 102 is located on the front side of the device 100, so that the display screen faces in a direction opposite the direction towards which the camera is directed. Therefore, a user viewing the display screen 102 may have the same viewing angle as image capture device 108. As illustrated, device 100 of FIG. 2B also includes memory card slot 110. It should be appreciated that the memory card may be interchanged between users in order to swap information with other users.

FIG. 3 is a simplified schematic diagram of an image capture device being utilized in an augmented reality application in accordance with one embodiment of the invention. Here, device 100 is being held by a user with a real-world scene 103 being augmented with computer graphics on display screen 102. Real-world scene 103 includes a street bordering buildings having mountain scenery in the background. The computer graphics incorporated into real-world scene 103 is car 105. In one embodiment, logic within the portable device recognizes the road or a marker on the road, e.g., the dividing line of the road, and incorporates the car into the scene. It should be appreciated that while a PLAYSTATION PORTABLE device is illustrated in FIGS. 1-3 the embodiments described herein may be incorporated into any handheld device having camera capability. Other suitable devices include a cell phone, a personal digital assistant, a web tablet, and a pocket PC.

Figure 4:
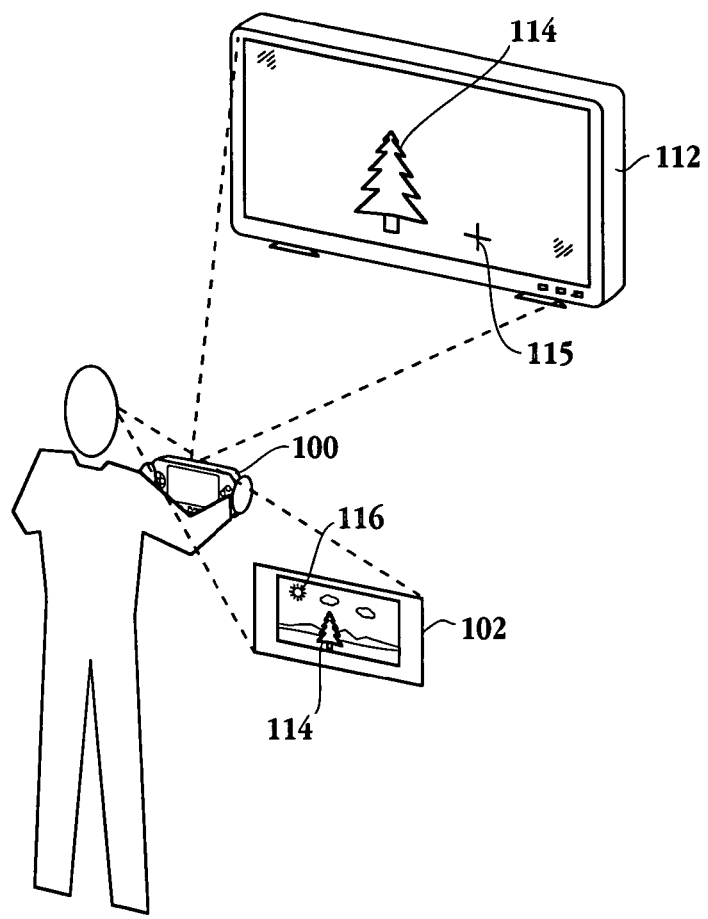
FIG. 4 is a simplified schematic diagram illustrating yet another application of the incorporation of computer graphics into a real world scene in accordance with one embodiment of the invention.

FIG. 4 is a simplified schematic diagram illustrating yet another application of the incorporation of computer graphics into a real world scene in accordance with one embodiment of the invention. Here, a user is holding portable device 100, which includes display 102. It should be noted that display 102 is expanded relative to device 100 for ease of explanation. An image capture device, which is incorporated into device 100, captures a scene being displayed on display device 112, which may be a television. Here, display device 112 illustrates a tree 114 being shown. Device 100 captures the image being displayed on device 112 and displays tree 114 on display screen 102. In addition to tree 114 being shown on display screen 102, device 100 incorporates additional objects into the scene. For example, sun 116 is incorporated into the scene being displayed on display screen 102. As described above, a marker, such as marker 115 of the first display device, may cause the incorporation of additional objects such as sun 116 into the second display device. It should be appreciated that device 100 includes a logic capable of recognizing objects such as tree 114 or marker 115 and thereafter responding to the recognition of such objects or markers by adding appropriate computer graphics such as sun 116 into the scene being displayed on device 100. Furthermore, the image capture device incorporated into portable device 100 may be a video capture device that continuously captures the changing frames on display device 112 and incorporates additional objects accordingly. As mentioned above, visual cues from the main display may be used to drive the synchronization with the portable display.

Figure 5:
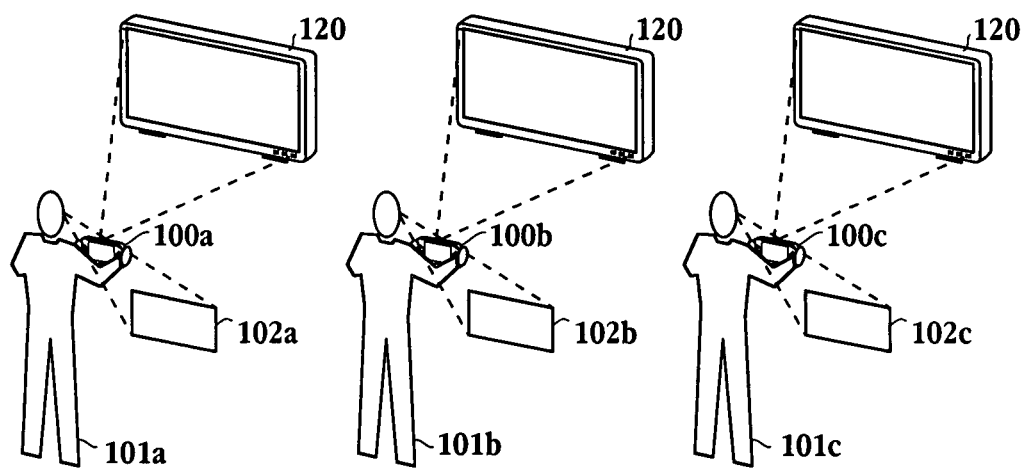
FIG. 5 is a simplified schematic diagram showing the plurality of users viewing a display monitor with a handheld device in accordance with one embodiment of the invention.

FIG. 5 is a simplified schematic diagram showing the plurality of users viewing a display monitor with a handheld device in accordance with one embodiment of the invention. Here, display device 120 is a single display device but is illustrated three different times for ease of explanation. Users 101a through 101c have corresponding handheld portable devices 100a through 100c, respectively. It should be appreciated that a game show, computer game, sporting event or some other suitable display may be being presented on display screen 120. Display devices 100a, 100b, and 100c capture the image being displayed on display screen 120 and augment image data or graphics into the captured image in order to provide additional information to users 101a through 101c. In one embodiment, a game show being displayed on display device 120 is being viewed by each of users 101a through 101c, so that users 101a through 101c may compete with each other. In another embodiment, the display on display screen 120, which is captured by devices 100a through 100c, includes data which may be analyzed by logic within device 100a through 100c so that each of the users see somewhat different displays on the corresponding display screens.

For example, with reference to a game of charades, one of the users 101a through 101c may have access to what the answer is while the other users do not have this access. In this embodiment, the television broadcast system may be used to incorporate extra data into the display data being shown by display 120 in order to provide extra functionality for users 101a through 101c. In essence, devices 100a through 100c enable extra data in the image being displayed on display 120 to be turned on. The extra data may be triggered by graphics within display 120 which are recognized by image recognition logic of the portable device.

Figure 6A:
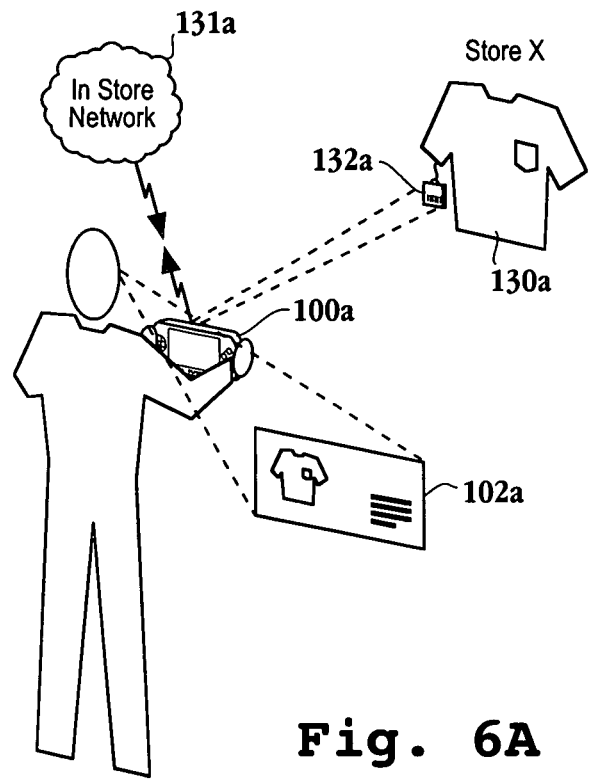
FIGS. 6A and 6B show yet another application of the use of a portable device capable of recognizing graphical data in accordance with one embodiment of the invention.
Figure 6B:
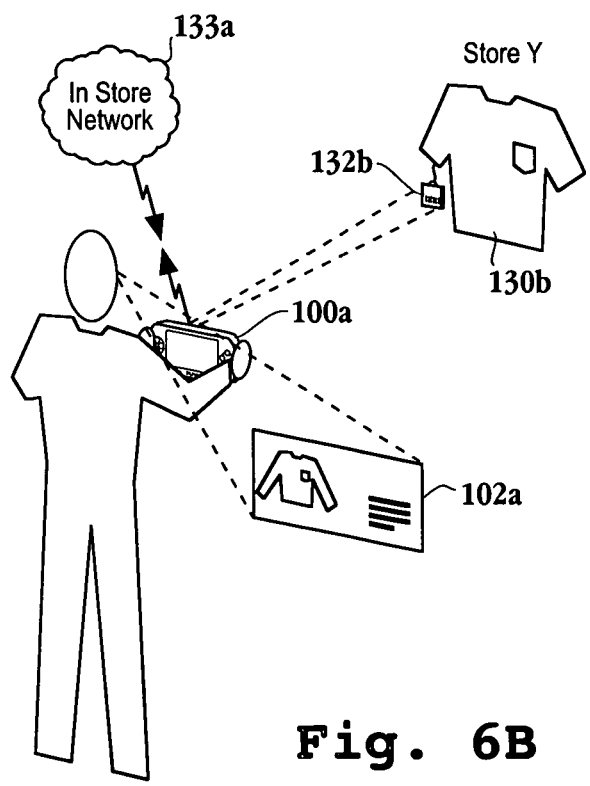

FIGS. 6A and 6B show yet another application of the use of a portable device capable of recognizing graphical data in accordance with one embodiment of the invention. Here, a user has a portable device 100a with display screen 102a. As mentioned above, display screen 102a is enlarged for ease of explanation. Device 100a is capable of being networked to in-store network 131a. Device 100a captures an image of a barcode 132a associated with product 130a. By recognizing barcode 132a and communicating with in-store network 131a wirelessly, device 100a is enabled to download information concerning the characteristics of item 130a. It should be appreciated that in place of barcode 132a device 100a may recognize a storage box containing item 130a or item 130a itself. Then, by communicating with in-store network 131a, a comparison of the captured image data with a library from in-store network 131a device 100a is able to locate the characteristics such as price, size, color, etc., of item 130a. The user then may move to store Y and use device 100a to download characteristics associated with item 130b. Here again, a barcode 132b or image data of item 130d or its storage container may be used to access the item characteristics, which can be any catalogue characteristics from in-store network 133a. From this data, the user is then able to compare the characteristics of item 130a in store X and 130b in store Y. Thus, where item 130a and 130b are the same items, the user is able to perform comparison-shopping in the different locations.

Figure 7:
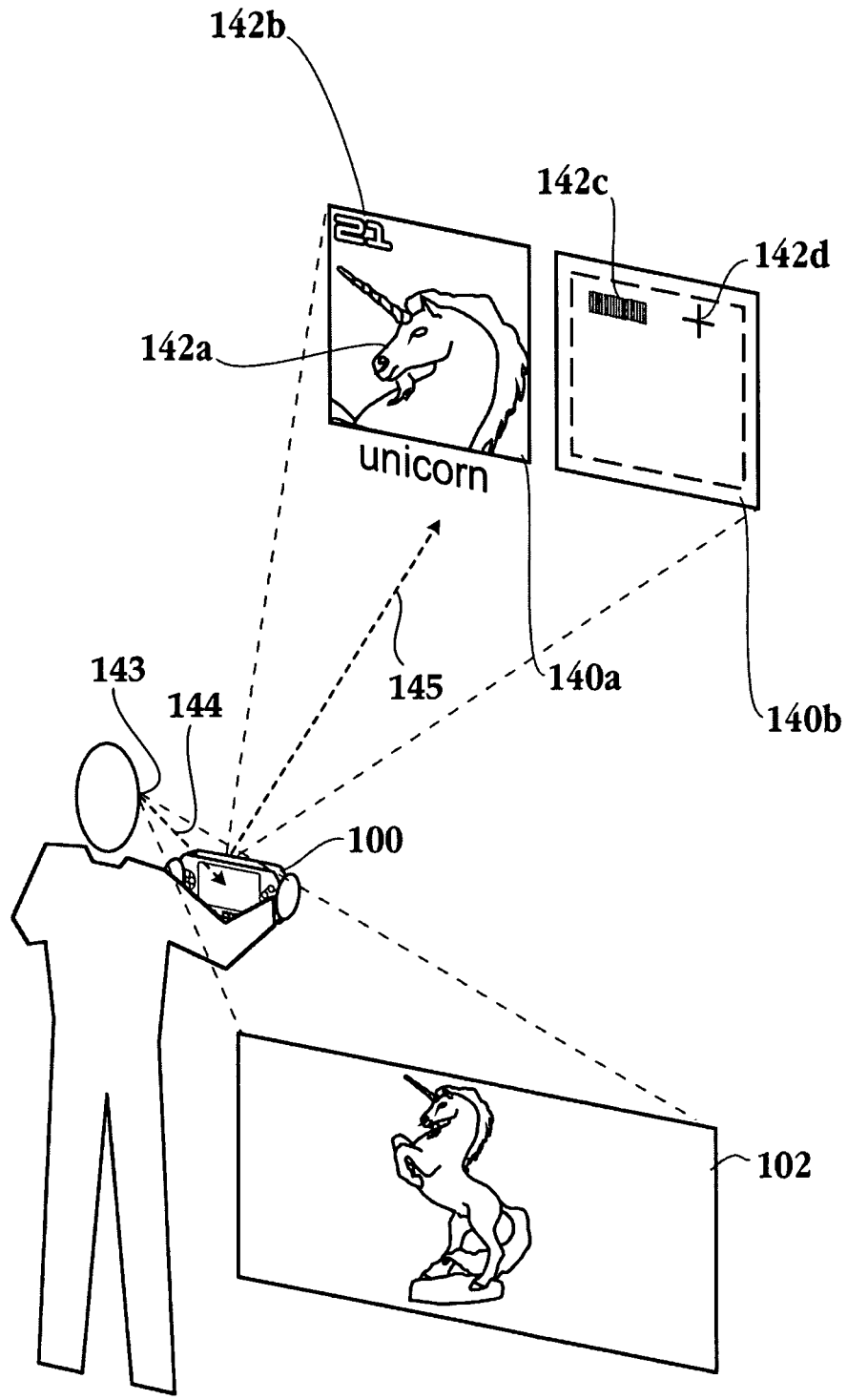
FIG. 7 is a simplified schematic diagram illustrating the use of a portable device and a card game application in accordance with one embodiment of the invention

FIG. 7 is a simplified schematic diagram illustrating the use of a portable device and a card game application in accordance with one embodiment of the invention. Here, the user is pointing device 100 toward cards 140b and 140b. The cards 140 and 140b may have symbols or some kind of graphical data, which is recognized by logic within device 100. For example, cards 140a has image 142a and numbers 142b, which may be recognized by image device 100. Card 140b includes barcode 142c and marker 142d which also may be recognized by device 100. In one application, these markings may indicate the value of the cards in order to determine which card is the highest. Once each of the images/markings of cards 140a and 140b are processed by the logic within device 100, a simulated fight may take place on display screen 102 where the winner of the fight will be associated with the higher of cards 140a and 140b. With respect to collectable cards, by using portable device 100 and a special recognizable design on the card (possibly the back of the card), a new computer generated graphic can be superimposed on the card and displayed on the portable display. For example, for sports cards, the sports person or team on the card can be superimposed in a real 3D view and animated throwing the ball, etc. For role-playing games, it is possible to combine the cards and a video game on the portable device so that collecting physical cards becomes an important part of the game. In this case, a character of the game may be personalized by the player and this information could be swapped with other players via wireless network or via removable media (e.g. Memory Stick).

A similar technique could be used to augment business cards. In addition to the normal printed material on a business (or personal) card, a special identifying graphic could be included. This graphic can be associated with the individual and will reference information about that person potentially including photos, video, audio as well as the normal contact info. The personal information could be exchanged via removable media. In another embodiment a unique graphic is indexed an on-line database via a wireless network to get the information about that person. Having accessed the information, a superimposed graphic, e.g., the person's photo, can be created in place of the graphic on the portable display.

With continued reference to FIG. 7, the user holds the device 100 in his/her hands during operation. As the user views the display screen of the device 100, the user's eye 143 has a view direction 144. As the user points the portable device 100 toward cards 140a and 140b, the image capture device 108 of the device 100 has a view direction 145. The location and view direction of the user's eye is independent of the location and view direction of the image capture device 108 of the device 100. This enables the user to view a scene captured by the image capture device 108 and allow augmentation with virtual objects from a perspective defined by the location and view direction of the image capture device 180, that is different from the location and view direction of the user's eye.

Figure 8:
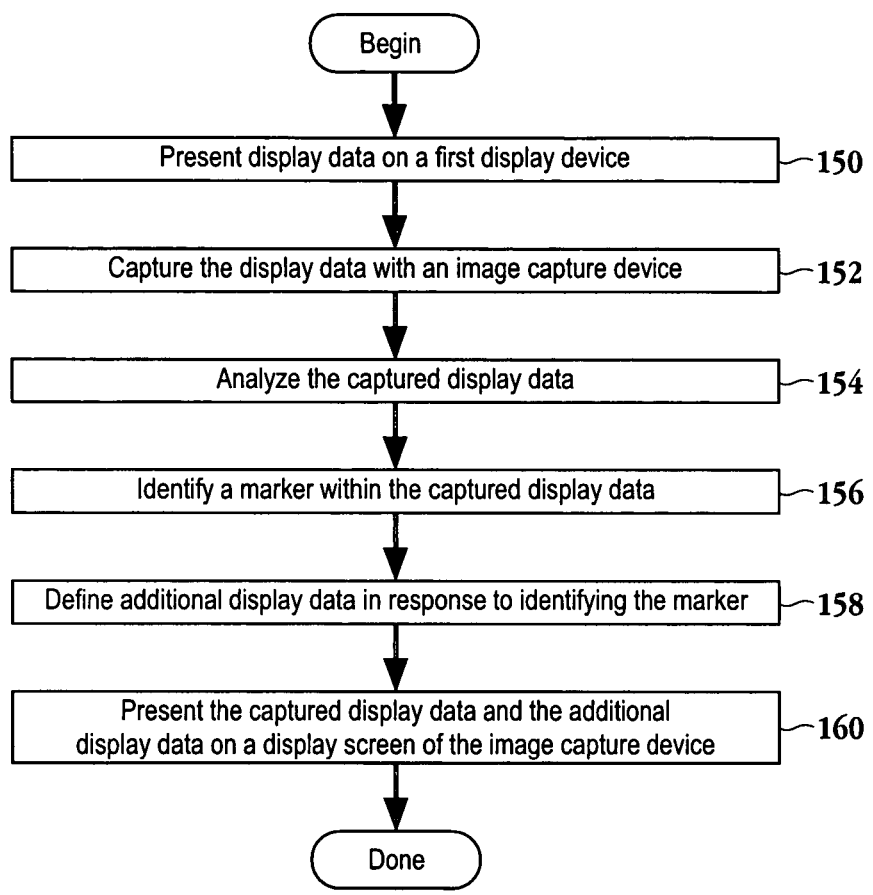
FIG. 8 is a flow chart illustrating the method operations for augmenting display data presented to a viewer in accordance with one embodiment of the invention.

FIG. 8 is a flow chart illustrating the method operations for augmenting display data presented to a viewer in accordance with one embodiment of the invention. The method initiates with operation 150 where the display data on a first display device is presented. Here, the display is shown on a television, computer monitor or some other suitable display device. Then in operation 152, the display data on the display device is captured with an image capture device. For example, the portable device having image capture capability discussed above is one exemplary device having image capture capability, which includes video capture capability. The captured display data is then analyzed in operation 154. This analysis is performed by logic within the portable device. The logic includes software or hardware or some combination of the two. In operation 156 a marker within the captured display data is identified. The marker may be a any suitable marker, such as the markers illustrated in FIGS. 4 and 7. In operation 158 additional display data is defined in response to identifying the marker. The additional display data is generated by image generation logic of the portable device. Alternatively, the additional data may be downloaded from a wireless network. The captured display data and the additional display data are then presented on a display screen of the image capture device in operation 160.

Figure 9:
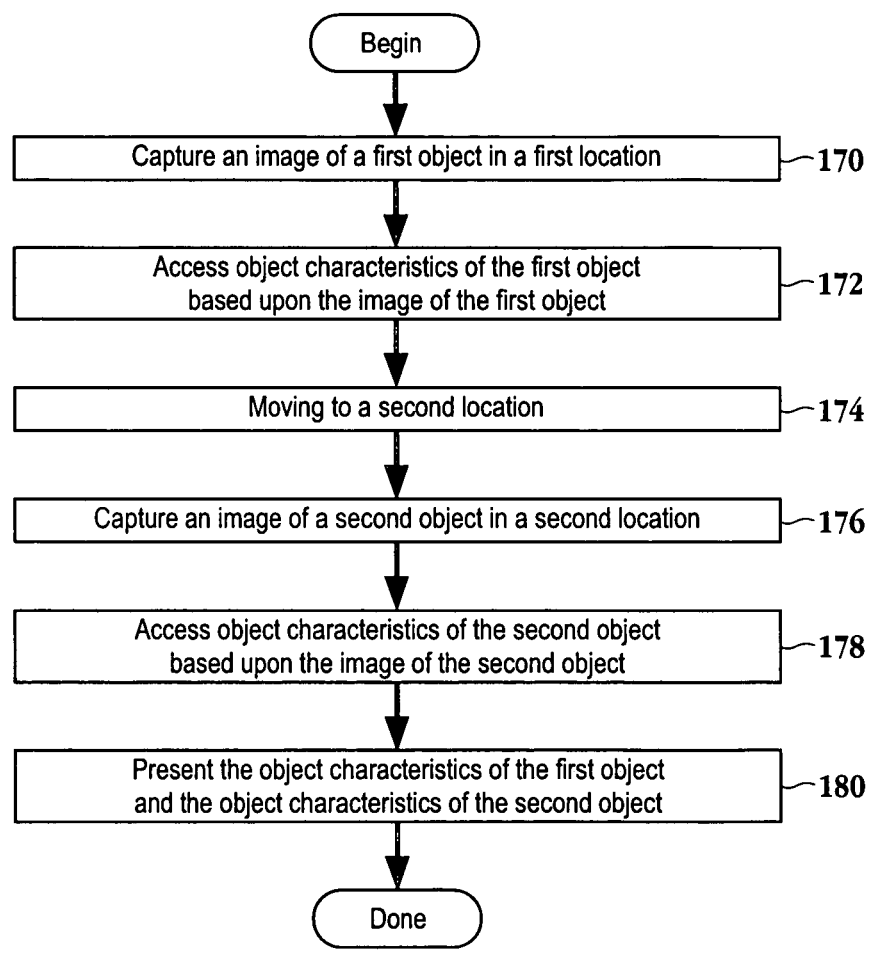
FIG. 9 is a flow chart illustrating the method operations for providing information in a portable environment in accordance with one embodiment of the invention.

FIG. 9 is a flow chart illustrating the method operations for providing information in a portable environment in accordance with one embodiment of the invention. The method initiates with operation 170 where an image of a first object is captured in a first location. For example, an image of an item in a first store may be captured here. In operation 172 the object characteristics of the first object are accessed based upon the image of the first object. For example, a wireless network may be accessed within the store in order to obtain the object characteristics of the first object. Then, in operation 174 the user may move to a second location. In operation 176 an image of a second object in the second location is captured. The object characteristics of the second object are accessed based upon the image of the second object in operation 178. It should be appreciated that in operations 172 and 178 the image data is used to access the object characteristics and not laser scan data. In operation 180 the object characteristics of the first object and the object characteristics of the second object are presented to a user. Thus, the user may perform comparison shopping with the use of a portable device based upon the recognition of video image data and the access of in-store networks.

Figure 10:
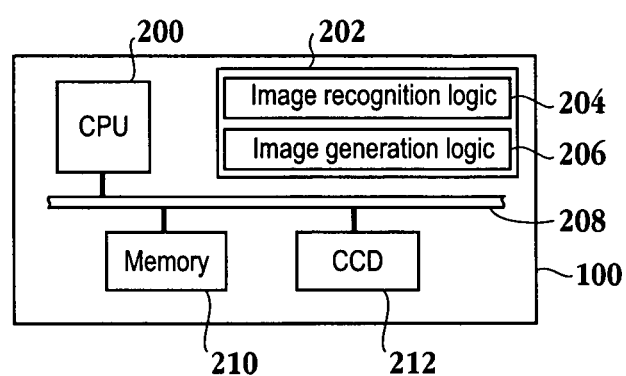
FIG. 10 is a simplified schematic diagram illustrating the modules within the portable device in accordance with one embodiment of the invention.

FIG. 10 is a simplified schematic diagram illustrating the modules within the portable device in accordance with one embodiment of the invention. Portable device 100 includes central processing unit (CPU) 200, augmented reality logic block 202, memory 210 and charged couple device (CCD) logic 212. As mentioned above, a complimentary metal oxide semiconductor (CMOS) image sensor may perform the camera functions on-chip in place of CCD logic 212. One skilled in the art will appreciate that a CMOS image sensor draws less power than a CCD. Each module is in communication with each other through bus 208. Augmented reality logic block 202 includes image recognition logic 204 and image generation logic 206. It should be appreciated that augmented reality logic block 202 may be a semiconductor chip incorporating the logic to execute the functionality described herein. Alternatively, the functionality described with respect to augmented reality logic block 202, image recognition logic 204 and image generation logic 206 may be performed in software. Here the code may be stored within memory 210.

In summary, the above-described invention describes a portable device capable of providing an enriched augmented reality experience. It should be appreciated that while the markers and graphics that are recognized by the system are computer generated, the invention is not limited to computer-generated markers. For example, a set of pre-authored symbols and a set of user definable symbols can be created which can be recognized even when drawn by hand in a manner recognizable to the camera of the image capture device. In this way, players could create complex 3D computer graphics via drawing simple symbols. In one embodiment, a player might draw a smiley face character and this might be recognized by the device and shown on the display as a popular cartoon or game character smiling. With user definable designs, users can also establish secret communications using these symbols.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A portable gaming device configured to provide an augmented reality experience on a display screen of the portable device, the portable device being a handheld device, comprising:

the display screen configured to display a real world scene, the display screen disposed on a front side of the portable gaming device;

an image capture device associated with the display screen, the image capture device configured to capture real video image data representing the real world scene, the image capture device disposed on a back side of the portable gaming device opposite the front side;

a first input region defined on the front side for holding by a first hand of a user, the first input region disposed on a first adjacent side of the display screen, the first input region having one or more input buttons;

a second input region defined on the front side for holding by a second hand of the user, the second input region disposed on a second adjacent side of the display screen opposite the first adjacent side, the second input region having one or more input buttons;

image recognition logic configured to analyze the real video image data representing the real world scene to identify a marker in the real video image data representing the real world scene, the augmenting visual media being related to a gaming environment and response to the first input region and the second input region, media generation logic responsive to the image recognition logic, the media generation logic configured to display at least part of the real world scene from the real video image data along with augmenting visual media on the display screen, the augmenting visual media being a moving animation superimposed in and around the real world scene, wherein the image recognition logic is configured to communicate identification of the marker in the real video image data to the media generation logic, and in response to the identification of the marker in the image data, triggering integration of the augmented visual media into the real world scene as viewed through the display screen of the portable gaming device, wherein the portable gaming device provides a view of the moving animation through the display screen;

wherein the augmenting visual media and the at least part of the real world scene is presented on the display screen of the portable gaming device and wherein at least part of the processing by the image recognition logic and the media generation logic occur within the portable gaming device;

wherein the portable gaming device is configured to be handheld during operation, such that a location and view direction of the user's eye viewing the display screen is independent of a location and view direction of the image capture device, to facilitate viewing of the augmented visual media integrated with the real world scene from a perspective defined by the location and view direction of the image capture device, independent of the location and view direction of the user's eye.

2. The portable gaming device of claim 1, wherein the image capture device is removable.

3. The portable gaming device of claim 1, wherein the image capture device is affixed to one of a surface above the display screen or a surface behind the display screen.

4. The portable gaming device of claim 1, further comprising:
a memory card slot for inserting a memory card; and
wireless networking access capability.

5. The portable gaming device of claim 4, further comprising:
a memory card inserted into the memory card slot, the memory card configured to be shared with other portable devices.

6. The portable gaming device of claim 1,
wherein the display screen faces in a first direction; and
wherein the image capture device is directed in a second direction opposite the first direction.

7. A method for augmenting real video display data presented to a viewer on a display screen of a portable gaming device having an image capture device, the portable gaming device being a handheld device, comprising method operations of:
capturing the real video display data with the image capture device, the image capture device disposed on a back side of the portable gaming device;
analyzing the captured display data through image recognition logic incorporated into the portable gaming device;
identifying a marker within the captured display data through the analyzing, obtaining audio/visual media in response to identifying the marker within the captured display data, and the identified marker dictating which audio/visual media to obtain from a database; and
upon identifying the marker, presenting on the display screen and through sound output of the portable gaming device, for a period of time, augmenting audio/visual media along with at least part of the captured real video display data, the display screen disposed on a front side of the portable gaming device opposite the back side;
receiving input from one or more input buttons defined on a first input region disposed on a first adjacent side of the display screen, the first input region defined on the front side of the portable gaming device for holding by a first hand of a user;
receiving input from one or more input buttons defined on a second input region disposed on a second adjacent side of the display screen opposite the first adjacent side, the second input region defined on the front side of the portable gaming device for holding by a first hand of a user;
wherein the audio/visual media is identified by the marker;
wherein a visual part of the augmenting audio/visual media is defined by moving animation superimposed in and around real world objects found in the captured display data, the augmenting visual media being related to a gaming environment and response to the received input;
wherein the portable gaming device provides a view of the moving animation through the display screen of the portable gaming device;
wherein the portable gaming device is configured to be handheld during operation, such that a location and view direction of a user's eye viewing the display screen is independent of a location and view direction of the image capture device, to facilitate viewing of the augmented visual media integrated with the real world scene from a perspective defined by the location and view direction of the image capture device, independent of the location and view direction of the user's eye.

8. The method of claim 7, wherein the portable gaming device is capable of executing a video game.

9. The method of claim 7, wherein the marker is hand drawn.

10. The method of claim 7, wherein the image capture device is a video capture device.

11. The method of claim 7, wherein the method operation of analyzing the captured display data includes,
comparing the captured display data with data stored in a memory of the image capture device, the memory being detachably linked to the image capture device.

12. The method of claim 7,
wherein the display screen faces in a first direction; and
wherein the image capture device is directed in a second direction opposite the first direction.

13. A handheld device configured to provide an augmented reality experience on a display screen of the handheld device, comprising:
the display screen configured to display a real world scene, the display screen disposed on the front side of the handheld device;
and image capture device associated with the display screen, the image capture device configured to capture real video image data representing the real world scene, the image capture device disposed on a back side of the handheld device opposite the front side;
an input region defined on the handheld device;
image recognition logic configured to analyze the real video image data representing the real world scene to identify a marker in the real video image data representing the real world scene;
media generation logic responsive to the image recognition logic, the media generation logic configured to display at least part of the real world scene from the real video image data along with augmenting visual media on the display screen, the augmenting visual media being a moving animation superimposed in and around the real world scene, the augmenting visual media being related to a gaming environment and responsive to the input region;
wherein the image recognition logic is configured to communicate identification of the marker in the real video image data to the media generation logic, and, in response to the identification of the marker in the image data, trigger integration of the augmenting visual media into the real world scene as viewed through the display screen of the handheld device.

* * * * *